Patented May 27, 1952

2,598,282

UNITED STATES PATENT OFFICE 2,598,282

FOOD COMPOSITIONS AND METHODS OF PRODUCING SAME

Daniel Melnick, Teaneck, N. J., assignor to The Best Foods, Inc., New York, N. Y., a corporation of New Jersey No Drawing. Application January 28, 1950, Serial No. 141,151

17 Claims. (Cl. 99—139)

This invention relates to food compositions and more particularly to dry frosting mixes and methods of producing them.

An object of this invention is to provide economical, easily prepared, frosting mixes, which, on the addition of water, produce in a matter of minutes a fluffy, viscous, highly palatable frosting.

Another object of this invention is to provide frosting mixes which do not change in their properties despite relatively long shelf life in the absence of refrigeration.

Frostings consist for the most part of sugar, fat, milk or milk solids, a small amount of salt and flavoring and sufficient water to form a smooth pliable plastic mass. Since sugar is the major quantitative component, it is primarily responsible for the bulk and sweetness of the product. The fat reduces the sweetness of the product, improves texture (mouthing qualities), and minimizes the rate of moisture loss so that the frosting remains soft for longer periods than would obtain otherwise. Milk or milk solids enhance the flavor of frostings and improve setting properties. The added flavors are the elements which impart character to frostings. Salt has the faculty of bringing out the more delicate flavors and also of minimizing undesirable properties, such as excessive sweetness or sharpness. Other materials may be added such as aerating or drying agents to impart quick-setting properties to frostings and to make them fluffy. In this category are egg white, gelatin, agar, sodium alignate, starch, gums and pectins.

While the development of a formula for a frosting to be made by blending individual ingredients just prior to use is a relatively simple problem, the discovery of a packaged dry mix capable of readily yielding a frosting of comparable quality poses a challenge which heretofore has not been effectively met. In the case of the former, ingredients containing appreciable amounts of water may be used. Thus, the baker may add corn syrup or a concentrated solution of invert sugar to prepare a fondant. Likewise, the baker may use relatively limpid or low melting fats, such as butter or margarine, in his formulations; the shelf life of his product is so short (most often a matter of days) that instability of the fat component is not a serious problem. He may add egg white (the protein already in solution) or solutions of the other aerating or setting agents noted above.

A totally different situation prevails with a packaged frosting mix to be sold in the trade. Materials containing appreciable amounts of water cannot be employed; preferential solubility of one ingredient, viz. an aerating or setting agent, over another cannot be assured; and ingredients of limited stability in the absence of refrigeration cannot be used.

The following specific requirements must be satisfied for the provision of a satisfactory packaged frosting mix:

1. The mix must not only be economical to use but must also be complete, requiring only the addition of water to make an acceptable frosting.

2. The frosting must be easily and rapidly prepared by the user, such as the housewife, with a minimum of effort and equipment.

3. The mix should permit marked departures from the recommended procedure for preparing the frosting.

4. The frosting must be highly acceptable in texture, handling characteristics, setting properties and flavor. These same characteristics must be evident when the mix is employed as the base for preparing a wide variety of frostings.

5. The mix must be made of ingredients which are in themselves stable and/or blended in such a way that the packaged product exhibits long shelf life despite the absence of refrigeration, of hermetical sealing, storage under an inert gas or other measures required in holding the primary ingredients in the form customarily employed by the baker in preparing a high quality frosting.

The compositions of this invention meet these requirements. The compositions require only the addition of hot water and beating in a bowl to yield within a period of three or four minutes a smooth, viscous, fluffy frosting, marshmallow-like in flavor and very glossy. The frostings pile attractively, spread easily and crust over rapidly, enhancing sheen and smoothness. The crusts, however, are exceedingly thin, not detectable in the mouth, but are sufficient barriers to maintain moist the underlying frostings for days on end. The compositions are economical to use, comparing favorably with the cost to the housewife of the ingredients which she would otherwise employ. The compositions exhibit surprising tolerance for excess quantities of water, for the temperature of the water supplement, for differences in mixing times and mixing speeds and for the temperature of the cake to be frosted. The compositions are multi-purpose mixes, lending themselves as the bases for preparing a wide variety of frostings. The ingredients in the composition are blended in such a way that the product does not deteriorate measurably during shelf-life, either in commercial outlets or in the home.

The dry frosting mixes of this invention comprise at least 70%, and preferably 75 to 90%, of powdered sugar; ¼ to 1½%, and preferably ⅖ to ¾%, of sodium bicarbonate; ¼ to ¾%, and preferably ⅓ to ⅔% of an edible, solid, aliphatic polycarboxylic acid having a dissociation constant for the first hydrogen of at least $1 \times 10^{-5}$, which is preferably citric acid; and at least 5%, and preferably 5 to 15%, of an edible fat having incorporated in it at least 0.2%, such as 0.2 to 2.0%, and preferably 0.5 to 1.0%, of a water dispersible emulsifying agent. The water dispersible emulsifying agent may be any member of the following classes or mixtures of them:

(a) Partial fatty esters of polyhydric alcohols containing at least one polyoxyethylene chain;
(b) Complete fatty acid esters of the condensation products of polyhydric alcohols and ethylene oxide in which all of the hydroxyl groups of the alcohols contain polyoxyethylene chains;
(c) Partial fatty acid esters of polyoxyethylene glycol; and
(d) Complete fatty acid esters of polyoxyethylene glycol.

The water dispersible emulsifying agents contain at least 5 oxyethylene units per mol, and each fatty acid group contains at least 12 carbon atoms.

Preferably the water dispersible emulsifying agent may be any member of the following classes or mixtures of them:

(a) Partial fatty acid esters of the anhydrides of six-carbon sugar alcohols containing at least one polyoxyethylene chain, the oxyethylene units per mol of ester being 5 to 20; and more desirably, tri-fatty acid esters of polyoxyethylene sorbitan containing 15 to 20 oxyethylene units in the one polyoxyethylene chain;
(b) Complete fatty acid esters of the condensation products of six-carbon sugar alcohols and ethylene oxide in which all of the hydroxyl groups of the sugar alcohols contain polyoxyethylene chains, the oxyethylene units per mol of ester being 20 to 80; and more desirably, the complete fatty acid esters of the condensation products of sorbitol and ethylene oxide in which all of the hydroxyl groups contain polyoxyethylene chains, the oxyethylene units per mol of ester being 30 to 60;
(c) Partial fatty acid esters of polyoxyethylene glycol, the oxyethylene units per mol of ester being 20 to 50; and more desirably 25 to 45; and
(d) Complete fatty acid esters of polyoxyethylene glycol, the oxyethylene units per mol of ester being 20 to 80; and more desirably 25 to 60.

Each fatty acid group in all of the preferred water soluble dispersible agents contains 12 to 20 carbon atoms and more desirably 16 or 18 carbon atoms.

The synergism between the water dispersible emulsifying agent and the highly reactive carbonation system in the frosting mixes of this invention is responsible, and the combination of both is essential, for the production of a fluffy, viscous, non-curdly frostings within a matter of minutes following the simple addition of water to such mixes. While the carbonation system operates satisfactorily to achieve this new result when the sodium bicarbonate and the solid, aliphatic polycarboxylic acid are within the quantitative limits heretofore described, desirably the ratio of sodium bicarbonate to the acid is from 0.8 to 3.3 parts, and preferably 1.0 to 1.5 parts, of sodium bicarbonate to 1 part of the acid. With the desirable ratio, the pH of the resulting frostings is within the range of 5 to 7, and with the preferred ratio, the pH of the resulting frostings is in the neighborhood of 6. Maximum flavor acceptability is obtained with the preferred ratio.

For non-fluffy frostings, made even with solid edible fats, the water dispersible emulsifying agents employed in the compositions of this invention are not required since failure to disperse the fat is not readily discernible. However, with the fluffy frostings produced with the mixes of this invention, failure to disperse the fat is easily detectable upon visual examination. To eliminate the curdly appearance of such fluffy frostings, it is essential that the fat contain at least 0.2% of the water dispersible emulsifying agents heretofore described. While relatively high concentrations of such dispersible emulsifying agents, even exceeding 2% on the fat, may be used without impairing the appearance of the resulting frostings, excessively high concentrations of these bitter-tasting agents cannot be employed without reducing flavor acceptability. Since the fat component of the frosting mixes of this invention may vary from 5 to 28%, and preferably 5 to 15%, the frosting mixes to assure flavor acceptability should not contain more than 0.3% of the water dispersible emulsifying agents.

Any glyceridic oil may be used in formulating a frosting mix provided that shelf life of the product is not critical or that other considerations are by-passed. Thus, limpid (unhydrogenated) vegetable oils may be employed as the fat component in a mix, oily in appearance, to be used soon after manufacture, viz. within one month. Completely hydrogenated oils may also be used, provided the emulsifying agents at the levels heretofore described and heating of the frosting are employed to expedite dispersion of the high melting fat (140–160° F.) in water. Despite the fact that the resulting products are satisfactory in appearance, they still have limited acceptability; the tallowy character of the resulting frostings is objectionable in the mouth, and the fats are only partially available (absorbed) during the digestive process.

Partially hydrogenated vegetable oils having a melting point of 90° to 115° F. (preferably 100° to 110° F.), and a congealing point of 75° to 95° F. (preferably 80° to 90° F.) are the most desirable fats to be employed in the compositions of this invention. The melting point of the fat may be determined by the Wiley method, and the congealing point by the method described in U. S. Patent No. 2,047,530 (July 14, 1936) of H. W. Vahlteich et al. The congealing point is frequently referred to as the setting point. The resulting frosting mixes are dry (non-oily) in appearance, are not rancid even after shelf life of many months, and yield fluffy frostings, free of visible fat particles, within a matter of minutes following the simple addition of water. Such resulting frostings have excellent mouthing qualities, and the fats are completely available during the digestive process.

The fat component must be at least 5% of the frosting mixes of this invention. Smaller concentrations are not satisfactory since the frosting exhibits too rapid a rate of moisture loss; a dry icing results which fails to adhere satisfactorily to the cake and has a granular consistency in the mouth. Concentrations of the fat above the preferred limit of 15% are not objectionable, provided that the concentrations of the water dispersible emulsifying agents in the frosting mix are proportionally increased. The only objections to concentrations of fat in excess of 15% in the frosting mixes are the relatively greater cost of the fat component and the necessity of using minimal concentrations of the water dispersible agents in the fat in order that the concentrations of these agents, for purposes of taste acceptability, are below the maximal concentration of 0.3% of such agents in the frosting mixes.

In addition to the water dispersible emulsifying agents, the fat component of the frosting mixes preferably contain three types of additives. These additives are (a) a mixture of mono-, di- and tri-aliphatic citrates, such as mono-, di- and tri-alkyl or -alkylene citrates, in concentrations of 0.02 to 0.1% and preferably in concentrations of 0.04 to 0.08%, (b) phosphatides, such as lecithin in concentrations of 0.15 to 0.45% and preferably 0.25 to 0.35%, and (c) a mixture of mono- and di-glycerides of fatty acids having 16 and 18 carbon atoms in concentrations of 0.5 to 2.0% and preferably in concentrations of 0.75 to 1.25%. The concentrations in all cases is based on the percentage of each ingredient in the fat component. The specific concentrations of phosphatides are as pure phosphatides and not as commercial products, such as commercial soya bean lecithin, which may be used as such in the frosting mixes to supply the phosphatides.

The aliphatic citrates, particularly the mono-aliphatic citrates operate as metal scavengers, inhibiting trace metal catalysis of the oxidation of the fat. Since no fat is prepared on a commercial scale completely free of trace metals and since the frosting mixes of this invention are desirably made in iron mixers with iron agitators, an operation which may be responsible for further metal contamination of the fat, it is essential that metal scavengers be included in the fat if the mix is to exhibit long shelf life. Another function of the aliphatic citrates, particularly the mono- and di-aliphatic citrates, resides in their characteristics that they can be homogeneously dispersed in a fat and are edible acids having a dissociation constant greater than $1 \times 10^{-8}$. Thus, the citric acid esters prevent alkaline catalytic hydrolysis of the fat tri-glycerides during the storage of the frosting mixes prepared according to the preferred method, to be hereinafter described, involving the suspension of sodium bicarbonate in the fat.

The phosphatides, like the mono- and di-aliphatic citrates, operate as metal scavengers in enhancing the stability of the fat and as fat dispersible acids capable of preferentially binding sodium ions derived during improper storage of the frosting mixes from the sodium bicarbonate blended with the fat. In addition, the phosphatides tend to hydrate and thereby improve the body of the prepared frostings. As it is hereinafter shown, the latter property of the phosphatides is not apparent until they act synergistically with the carbonation system in the preferred frosting mixes of this invention. In short, the carbonation system is essential for this property of the phosphatides to become evident, and the synergism is even more pronounced in the added presence of the water dispersible agent.

The mixture of mono- and di-glycerides of fatty acids having 16 and 18 carbon atoms is added because of its synergistic effect in increasing the specific volume (fluffiness) and viscosity of the preferred frosting mixes of this invention containing in the fat the water dispersible emulsifying agents heretofore described with or without the phosphatides.

The preferred frosting mixes of this invention contain up to 10% of milk powder, preferably skim milk powder sometimes called milk solids, non-fat, and preferably concentrations of 2 to 5% of skim milk powder, and up to 5% and preferably 1 to 2% of an edible, bland, cold-water-soluble starch. The skim milk powder is preferably one obtained following minimal heat processing (pasteurization followed by drying) so that its functional properties, particularly with respect to solubility of the proteins, are not impaired. The skim milk solids are of value in yielding frostings with more flavor appeal and also because they mask the tart flavor of preferred frostings with a pH in the neighborhood of 6. In addition, the presence of skim milk solids in the frosting mixes contributes to the body (viscosity) of the frostings without sacrificing fluffiness when these are prepared with mixes that have been subjected to long storage, to the point that much of the carbonation system has been dissipated. Concentrations of skim milk solids above 10% in the mix are contra-indicated since, despite the use of a novel procedure hereinafter to be described for inhibiting non-enzymatic browning, this form of food deterioration still occurs at the higher concentrations of the milk powder. These changes are of such a character that the products become brown in color and exhibit off-flavors. Preference is exhibited for the use of skim milk rather than whole milk solids since the latter contain butter fat which is susceptible to oxidative rancidity.

The bland cold-water-soluble starch is added to the preferred frosting mixes of this invention in order to reduce the sweetness and tart flavors of the resulting frostings and to maintain the body (viscosity) of the resulting frostings prepared from mixes that had been improperly stored for many months. Since the starch component does not participate in the non-enzymatic browning reaction, the inclusion of it in the frosting mixes permits the use of quantities of skim milk powder smaller than the amounts which otherwise would be required in the preparation of frostings with optimal flavor appeal.

Flavoring agents including common salt are incorporated in the preferred frosting mixes of this invention in order to permit the preparation of a wide variety of frostings to suit individual or group preferences. Thus as little as 0.0001 part of a flavoring agent such as coumarin and as much as 12 parts of another flavoring agent such as cocoa may be added to 100 parts of the preferred frosting mixes of this invention in order to effect improvement in organoleptic properties. These concentrations and types of flavoring agents are noted simply for illustrative purposes and do not encompass all of the variations possible.

Various methods may be employed for producing the frosting mixes of this invention. If stability of the frosting mixes and other considerations bearing on the ease of preparation and appearance of the final frosting are of little moment, all of the ingredients of the frosting mixes may be simply mixed together in any sequence desired. However, such frosting mixes exhibit poor shelf life since the carbonation system is quickly dissipated, the hydrophile-lypophile balance of the emulsifying system is destroyed and non-enzymatic browning occurs to an excessive degree when skim milk powder is a component. These changes are more readily apparent on examination of the frostings produced from such mixes. In addition, difficulty is encountered in dispersing adequately the gross fat particles or globules of varying size in the aqueous phase, even in the case of such mixes when freshly prepared.

The frosting mixes are desirably prepared by segregating one reactive ingredient of the frosting mix from another reactive ingredient by a fat barrier. The sodium bicarbonate is homogeneously suspended in the fat component containing the water dispersible emulsifying agent. The resulting mixture, desirably with a portion of the sugar component added to it, is then thoroughly mixed in an atmosphere of air or inert gas until a uniform, aerated, plastic mass is obtained. Such procedure assures the uniform distribution throughout the mass and the coating of the particles of sodium bicarbonate. If aliphatic citrates, mixtures of mono- and di-glycerides of fatty acids and/or phosphatides are components of the frosting mix, they are incorporated in the fat prior to this creaming step. The remaining ingredients of the frosting mix are then added and mixing is continued until a uniform, free flowing mass is obtained. By this procedure, the solid, aliphatic polycarboxylic acid having a dissociation constant for the first hydrogen of at least $1 \times 10^{-5}$ is separated from the sodium bicarbonate by a fat barrier thereby markedly enhancing the stability of the carbonation system of the frosting mixes during storage. If powdered milk is present, non-enzymatic browning is inhibited because of the close proximity of the polycarboxylic acid to the particles of milk powder. Such polycarboxylic acids inhibit during storage of the frosting mix the decomposition and polymerization of reducing sugars catalyzed by components having free amino groups, reactants present in the milk powder. Moreover, the fat barrier does not interfere with the evolution of carbon dioxide in preparing the frosting since the finely distributed and highly aerated fat containing the water dispersible emulsifying agent is readily dispersed in the added water, making the sodium bicarbonate available for reaction with the polycarboxylic acid.

While the desirable method heretofor described results in a marked improvement in the stability of the basic frosting mixes of this invention, a modified method is preferably followed in preparing frosting mixes of optimal acceptability. The first step in the preferred method is to disperse homogenously in the fat component, containing the mono- and di-glycerides, an edible anhydrous acid having a dissociation constant greater than $1 \times 10^{-3}$. This edible anhydrous acid may be mono- or di-aliphatic citrates, such as mono- or di-alkyl or -alkylene citrates, and phosphatides, such as lecithin. Just prior to formulation of the frosting mix, substantially moisture free sodium bicarbonate and the water dispersible emulsifying agent, also substantially moisture free, are added to the supplemented fat component. A portion of the powdered sugar component, desirably ½ to 3 times, and preferably 1½ to 2 times, the weight of the resulting fat mixture is added, and the composition thoroughly mixed in an atmosphere of air or inert gas until a uniform, aerated plastic mass is obtained. The specific volume of the creamed mass is preferably between 1.15 and 1.3. There are then added to the creamed mass the remaining ingredients of the frosting mix, which includes the balance of the powdered sugar, the substantially moisture-free aliphatic polycarboxylic acid having a dissociation constant for the first hydrogen of at least $1 \times 10^{-5}$ and the optional components of the frosting mix, such as skim milk powder, the cold-water-soluble starch and flavoring agents. The resulting mixture is then agitated until a uniform, free flowing mass is obtained in which no gross fat particles are visual. This latter result is readily achieved by effecting a specific volume between 1.15 and 1.3 in the creamed mass prior to the addition of the remaining ingredients. The fat components in the preferred frosting mixes of this invention are then readily dispersible in water within a few minutes in preparing the frostings.

As heretofore stated, there is in the frosting mixes of this invention a synergism between the water dispersible emulsifying agent and the highly reactive carbonation system. And the combination of both is essential for the production of fluffy, viscous, non-curdly frostings within a few minutes following the addition of water to frosting mixes of this invention. Such frostings are glossy and viscous and have high specific volumes. These properties assure ease of handling, more effective coverage of the cake to be frosted and a smooth glossy appearance to the frosted product. In addition to the synergism between the water dispersible emulsifying agent and the carbonation system, further synergistic effects are manifest in the frostings produced from the preferred frosting mixes of this invention as the result of having incorporated in such frosting mixes of phosphatides and/or a mixture of mono- and di-glycerides. These synergistic effects, singly and in combinations, are clearly appearent in studies involving a basic mix to which are added the components of the synergistic systems, singly and in combination. Illustrative data demonstrating such synergistic interrelationships are shown in Table I. For conclusively showing these interrelationships, comparisons were made with frostings prepared with mixes other than those of this invention. Experimental details of the data tabulated in Table I are given as footnotes to that table.

TABLE I

*The synergistic interrelationships among the emulsifying agents and the carbonation system in the frosting mixes of this invention as shown by comparison with other frosting mixes*

| Frosting Mix No. | Basic Mix Plus Ingredients as Indicated [1] | | | | Objective Measurements on Frostings [2] | | | Appearance of Frosting | Overall Rating of Frosting |
|---|---|---|---|---|---|---|---|---|---|
| | Lecithin,[3] Per Cent | Mono- and Diglycerides,[4] Per Cent | Water Dispersible Emulsifying Agent,[5] Per Cent | Carbonation System,[6] Per Cent | Specific Volume [7] | Viscosity, MacMichael Units [8] | Flowability, Seconds [9] | | |
| 1 | 0 | 0 | 0 | 0 | 0.81 | 4 | 1.5 | Dense, syrupy, fat not dispersed. | Very poor. |
| 2 | 0.050 | 0 | 0 | 0 | 0.86 | 6 | 2 | ----do---- | Do. |
| 3 | 0 | 0.100 | 0 | 0 | 0.82 | 5 | 1 | ----do---- | Do. |
| 4 | 0 | 0 | 0.075 | 0 | 0.84 | 5 | 2 | Dense, syrupy, glossy, fat almost dispersed. | Poor. |
| 5 | 0 | 0 | 0 | 1.023 | 1.11 | 10 | 5 | Fluffy, coarse, curdly, fat not dispersed. | Do. |
| 6 | 0.050 | 0.100 | 0 | 0 | 0.85 | 7 | 2 | Dense, syrupy, fat not dispersed. | Do. |
| 7 | 0.050 | 0 | 0.075 | 0 | 0.87 | 8 | 3 | Dense, syrupy, glossy, fat almost dispersed. | Do. |
| 8 | 0.050 | 0 | 0 | 1.023 | 1.23 | 17 | 48 | Fluffy, coarse, curdly, fat not dispersed. | Do. |
| 9 | 0 | 0.100 | 0.075 | 0 | 0.87 | 8 | 3 | Dense, syrupy, glossy, fat almost dispersed. | Do. |
| 10 | 0 | 0.100 | 0 | 1.023 | 1.12 | 16 | 25 | Fluffy, coarse, curdly, fat not dispersed. | Do. |
| 11 | 0 | 0 | 0.075 | 1.023 | 1.23 | 18 | 141 | Fluffy, sl. coarse, glossy, fat almost dispersed. | Fairly good. |
| 12 | 0.050 | 0.100 | 0.075 | 0 | 0.87 | 9 | 4 | Dense, syrupy, glossy, fat dispersed. | Poor. |
| 13 | 0.050 | 0.100 | 0 | 1.023 | 1.14 | 17 | 55 | Fluffy, coarse, curdly, fat not dispersed. | Do. |
| 14 | 0.050 | 0 | 0.075 | 1.023 | 1.27 | 23 | 250 | Fluffy, glossy, fat dispersed. | Very good. |
| 15 | 0 | 0.100 | 0.075 | 1.023 | 1.29 | 23 | 187 | ----do---- | Good. |
| 16 | 0.050 | 0.100 | 0.075 | 1.023 | 1.31 | 27 | 900+ | Fluffy, glossy, excellent body, fat dispersed. | Excellent. |

[1] The variables in the frosting mixes are indicated in the above columns; the basic mix common to all consisted of 83.143 parts of powdered sugar, 10.00 parts of fat, 5.00 parts of low-heat-processed skim milk powder, 0.500 part of salt and 0.260 part of vanilla flavoring agents. The fat was a 60:40 blend of cottonseed and peanut oils hydrogenated to have a melting point of 105° F. and a setting point of 85° F.; the fat contained 0.075% of a mixture of mono-, di-, and tri-isopropyl citrates.

[2] In each case 256 gms. of frosting mix plus 60 gms. of water at 140° F. were blended mechanically at low speed in an electric home mixer at room temperature for a period of 4 minutes. The temperature of the frostings was 84° F.

[3] Commercial soy lecithin was dissolved in the fat component, and the latter then plasticized; the concentration of phosphatides added is expressed, however, as percent of commercial lecithin in the frosting mixes. Commercial soy lecithin contains approximately 55% phosphatides, of which lecithin is the major fraction.

[4] A mixture of equal parts of mono- and di-glycerides of palmitic and stearic acids, the latter acids having an average molecular weight of 275. The mono- and di-glycerides were dissolved in the fat component, and the latter then plasticized. The concentration of these glycerides is expressed, however, as percent in the frosting mixes.

[5] Polyoxyethylene sorbitan trioleate, containing 20 oxyethylene units in a single polyoxyethylene chain. This water dispersible emulsifying agent was added to the plasticized fat just prior to formulation of the mixes; its concentration is expressed, however, as percent in the frosting mixes.

[6] Mixture of anhydrous sodium bicarbonate with anyhdrous citric acid in a ratio of 1.17 to 1.00. The bicarbonate was suspended in, and coated with the fat component, while the citric acid was added as a component of the fat-free supplementary ingredients used to disperse the creamed fat mixtures to yield free flowing products.

[7] Obtained by dividing the weight of a given volume of water at 4° C. (39.2° F.) by the weight of the same volume of the frostings.

[8] As measured by the MacMichael viscosimeter, Gramercy model, made by Eimer and Amend, New York city.

[9] The time in seconds required for the frostings in a uniform glass tube, 1.9 cm. inside diameter, to fall vertically between two marks 12 cm. apart. If the material still failed to flow after 900 seconds, the test was terminated.

From the results presented in Table I, the following conclusions are justified:

1. When only lecithin, the mixture of mono- and di-glycerides, or the water dispersible emulsifying agent are added to the basic mix, the resulting frosting mixes are all definitely unacceptable. (See data Frosting Mixes Nos. 1, 2, 3 and 4).

2. Supplementation of the base mix with the carbonation system alone yields a fluffy frosting (increase in specific volume), but a product curdly in appearance and of relatively low viscosity due to failure of dispersing the fat in the water (see data, Frosting Mix No. 5).

3. In the absence of the carbonation system, any combination of the lecithin, mono- and di-glycerides and water dispersible emulsifying agents in the fat component is ineffective in producing frosting mixes from which satisfactory frosting may be prepared. (See data, Frosting Mixes Nos. 6, 7, 9 and 12.)

4. The presence of both the water dispersible emulsifying agent and the carbonation system is essential in the formulation of an acceptable frosting mix. This fact is shown, by comparing Frosting Mix No. 11 with Frosting Mixes Nos. 4 and 5. The specific volume, viscosity, and flowability characteristics of the resulting frosting demonstrate that the effects due to the presence of the water dispersible emulsifying agent and the carbonation system are not merely additive, but are synergistic.

5. Lecithin and the mono- and diglycerides singly or in combination are unable to replace the water dispersible emulsifying agent in the composition comprising the basic mix and the carbonation system (compare Frosting Mixes Nos. 8, 10 and 13 with Frosting Mix No. 11.)

6. Whereas a synergistic effect is apparent between lecithin and the carbonation system (compare Frosting Mixes Nos. 2 and 5 with Frosting Mix No. 8), an additional synergistic effect is observed when the system also includes the water dispersible emulsifying agent (see data, Frosting Mix No. 14.)

7. The mixture of mono- and di-glycerides, which in themselves are without influence, exhibits synergistic relationships similar to those observed with lecithin (compare Frosting Mixes Nos. 3 and 5 with No. 10, and No. 11 with No. 15.)

8. The combination of the carbonation system, the water dispersible emulsifying agent, lecithin and the mixture of mono- and di-glycerides of the preferred frosting mixes of this invention results in a cumulation of potential synergistic effects, which are responsible for frostings of optimal acceptability. (Compare Frosting Mix No. 16 with any other frosting mix in Table I.)

Any member of the four classes of water dispersible emulsifying agents heretofore described may be substituted for the polyoxyethylene sorbitan trioleate used as the water dispersible emulsifying agent in the frosting mixes containing such agent described in Table I. When any of such agents are incorporated in the frosting mixes in accordance with this invention, the same synergistic relationships exist as exhibited with the polyoxyethylene sorbitant triboleate so that a fluffy glossy frosting with few, if any, visible fat particles is obtained. This fact is illustrated by the data in Table II on preferred frosting mixes of this invention showing the efficacy of each of the four preferred classes of water dispersible emulsifying agents.

Polyoxyethylene sorbitan monopalmitate (20 oxyethylene units per mol)

Polyoxyethylene sorbitan monolaurate (20 oxyethylene units per mol)

Polyoxyethylene glycerol monopalmitate (10 oxyethylene units per mol)

(b) Complete fatty acid esters of the condensation products of polyhydric alcohols and ethylene oxide in which all of the hydroxyl groups of the alcohols contain polyoxyethylene chains:

Polyoxyethylene sorbitol hexaoleate (30 oxyethylene units per mol)

Polyoxyethylene sorbitol hexastearate (40 oxyethylene units per mol)

Polyoxyethylene sorbitol hexaoleate (50 oxyethylene units per mol)

Polyoxyethylene glycerol tripalmitate (20 oxyethylene units per mol)

TABLE II

*Illustrative data on preferred frosting mixes of this invention showing the efficacy of each of the preferred four classes of water dispersible emulsifying agents*

| Frosting Mix No. | Water Dispersible Emulsifying Agent Incorporated | | Objective Measurements on Frostings [2] | | |
|---|---|---|---|---|---|
| | Class | Example | Specific Volume [2] | Viscosity, MacMichael Units [2] | Flowability, Seconds [2] |
| 17 | Partial fatty acid ester of a six carbon sugar alcohol containing 5 to 20 oxyethylene units in one or more polyoxyethylene chains. | Polyoxyethylene sorbitan tristearate with 20 oxyethylene units in the one polyoxyethylene chain. | 1.26 | 26 | 900+ |
| 18 | Complete fatty acid ester of the condensation product of a six carbon sugar alcohol and ethylene oxide in which all of the hydroxyl groups of the sugar alcohol contain polyoxyethylene chains, the oxyethylene units being 20 to 80. | Polyoxyethylene sorbitol hexastearate with 40 oxyethylene units in the six polyoxyethylene chains. | 1.36 | 26 | 900+ |
| 19 | Partial fatty acid ester of polyoxyethylene glycol containing 20 to 50 oxyethylene units in the polyoxyethylene chain. | Polyoxyethylene monostearate containing 40 oxyethylene units in the polyoxyethylene chain. | 1.30 | 27 | 382 |
| 20 | Complete fatty acid ester of polyoxyethylene glycol containing 20 to 80 oxyethylene units in the polyoxyethylene chain. | Polyoxyethylene stearate-oleate containing 25 oxyethylene units in the one polyoxyethylene chain. | 1.34 | 26 | 530 |

[1] The basic mix common to all frosting mixes in Table II was the Frosting Mix No. 13, described in Table I. To the fat component of this basic frosting mix was added the specific water dispersible emulsifying agent designated in Table II.
[2] The same footnotes in Table I apply to these column headings. The frostings prepared with the mixes in the above table were all scored as excellent; they were fluffy, glossy, had excellent body, and no visible fat particles.

Examples of edible, solid aliphatic polycarboxylic acids having a dissociation constant for the first hydrogen of at least $1 \times 10^{-5}$ used in the frosting mixes of this invention are: citric acid, tartaric acid, malic acid, succinic acid, aconitic acid, aspartic acid and glutamic acid. Instead of one acid, a plurality of the edible, solid aliphatic polycarboxylic acids may be used. For example, a combination of citric acid and tartaric acid may be used.

Specific examples of water dispersible emulsifying agents incorporated in the frosting mixes are:

(a) Partial fatty acid esters of polyhydric alcohols containing at least one polyoxyethylene chain:

Polyoxyethylene sorbitan monoleate (5 oxyethylene units per mol)

Polyoxyethylene sorbitan tristearate (20 oxyethylene units per mole)

Polyoxyethylene sorbitan trioleate (20 oxyethylene units per mol)

Polyoxyethylene sorbitan monostearate (20 oxyethylene units per mol)

(c) Partial fatty acid esters of polyoxyethylene glycol:

Polyoxyethylene monostearate (20 oxyethylene units per mol)

Polyoxyethylene monostearate (40 oxyethylene units per mol)

Polyoxyethylene monopalmitate (50 oxyethylene units per mol)

Polyoxyethylene monolaurate (30 oxyethylene units per mol)

(d) Complete fatty acid esters of polyoxyethylene glycol:

Polyoxyethylene stearate-stearate (40 oxyethylene units per mol)

Polyoxyethylene stearate-oleate (30 oxyethylene units per mol)

Polyoxyethylene stearate-oleate (25 oxyethylene units per mol)

Polyoxyethylene laurate-laurate (30 oxyethylene units per mol)

Examples of the preferred edible fats are: hydrogenated cotton seed oil, hydrogenated corn oil, hydrogenated peanut oil, hydrogenated soybean oil, having melting points in the range of 90 to 115° F. or mixtures of these fats; lard and butter; coconut oil as such or after hydrogenation until a melting point of 95° F. is obtained. Limpid (unhydrogenated) vegetable oils of the types listed above may be employed as the fat component in the frosting mixes if shelf life is not an important factor and if the oily appearance of the mix is not regarded as objectionable.

Examples of the flavoring agents employed are: common salt, vanillin, ethyl vanillin, extracts of vanilla beans, coumarin, cocoa, chocolate, fruit juices, artificial fruit flavors, almond extract and soluble coffee.

Examples of the mono-, di- and tri-aliphatic citrates used in some of the frosting mixes are: the mono-, di- and tri-esters of citric acid and the following alcohols: ethanol, isopropanol, butanols, hexanols, octanols, hexadeconols, octodecanols, propenol, butenols, hexenols, octenols, hexadecenols and octadecenols.

Examples of the edible anhydrous acids having a dissociation constant greater than $1 \times 10^{-8}$ are: acetic acid, lactic acid, lecithin and any of the mono- or di-aliphatic citrates heretofore specifically described.

As heretofore discussed, it is desirable from a stability standpoint to segregate the reactive ingredients of the carbonation system from each other by a fat barrier. The advantage of such segregation is shown in Table III.

consideration. Contrary to this prior teaching, it was discovered that the inclusion of the sodium bicarbonate in the fat component in the preferred frosting mixes of this invention not only has no deleterious effect on the stability of the fat, but actually markedly improves the stability and shelf life of the frosting mixes. On the other hand, if the acid ingredient of the carbonation system is incorporated in the fat component, the resulting frosting mixes have limited shelf life. The marked improvement in the shelf life of the frosting mixes containing the fat-coated sodium bicarbonate, as contrasted to the decreased shelf life of mixes containing the fat-coated acid ingredient of the carbonation system, is not related to stability of the fat per se or of the carbonation system, but is related to the stability of the emulsifying system. The free fatty acid content, the peroxide value and flavor of the fat in the frosting mixes and the available carbon dioxide content of the frosting mixes are not affected whether one or the other ingredient of the carbonation system is incorporated in the fat. It was discovered that the mechanism responsible for the loss (adverse modification) of the emulsifying system was esterification of the carboxyl group of the acid ingredient of the carbonation system by the free hydroxyl group of the water dispersible emulsifying agent. Even those water

TABLE III

*Comparative tests demonstrating the efficacy of the technique employed in stabilizing the carbonation system in preferred frosting mixes of this invention*

| Test System | Available Carbon Dioxide Content [1] | | | Per cent of original carbon dioxide retained in carbonation system |
|---|---|---|---|---|
| | Per cent of carbon dioxide in carbonation system | After storage of system at 95° F. at 100% relative humidity | | |
| | Initial | After 2 days | After 6 days | After 6 days storage |
| Unstabilized: Mixture of 0.471 parts of citric acid and 0.552 parts of sodium bicarbonate | 28.3 | 7.8 | 5.0 | 18 |
| Stabilized: Mixture similar to above but one ingredient of the carbonation system coated with 10.00 parts of fat [2] | 26.0 | 18.0 | 17.0 | 66 |

[1] Analyses conducted according to the Chittick method, Official and Tentative Methods of the Association of Official Agricultural Chemists, p. 208 (1945).
[2] The fat was a 60:40 blend of cottonseed and peanut oils hydrogenated to have a melting point of 105° F. and a setting point of 85° F.

A review of Table III reveals that the potential shelf life of the carbonation system of the frosting mixes of this invention under warm, humid conditions is enhanced about threefold by having a fat barrier separating the active ingredients of that system.

It would appear logical in stabilizing the carbonation system to incorporate the acid component in the fat. Fat and oil technologists have emphasized again and again the need to eliminate even trace quantities of alkali in refined oils in order that the stability of such oils be unimpaired. Soaps, which are weaker bases than sodium bicarbonate, provide an alkaline and catalytic medium for continued hydrolysis of fats on long term storage. Prior practices and recommendations dictated the exclusion of sodium bicarbonate from the fat component if the stability of the fat in the frosting mixes was of significant dispersible emulsifying agents which are complete esters (no free hydroxyl groups) must participate in this undesirable esterification reaction since the relatively strong acid ingredient of the carbonation system in the fat is capable of hydrolyzing these complete esters to yield compounds having one or more free hydroxyl groups and thereby become reactive. The resulting undesirable esters have a hydrophile-lipophile balance value incompatible with that required for dispersing the fat in the water in the course of preparing frostings. It was discovered that the sodium bicarbonate in the fat component prevented the undesirable esterification reaction from occurring.

The new result achieved by this discovery is illustrated in Table IV. In the study reported in this table, two frosting mixes were prepared which had identical ingredients, both qualitatively and quantitatively. The methods of formulations differed, however, as indicated in the table. The composition of each frosting mix was:

| | Per cent |
|---|---|
| Powdered sugar | 83.143 |
| Hydrogenated vegetable oil | 10.000 |
| Low-heat-processed skim milk powder | 5.000 |
| Anhydrous sodium bicarbonate | 0.552 |
| Common salt | 0.500 |
| Anhydrous citric acid | 0.471 |
| Vanilla flavoring agents | 0.260 |
| Polyoxyethylene sorbitan trioleate containing 20 oxyethylene units | 0.074 |

The hydrogenated vegetable oil, a 60:40 blend of cottonseed and peanut oils hydrogenated to a melting point of 105° F. and a setting point of 85° F., contained:

| | Per cent |
|---|---|
| A mixture of mono- and di-glycerides of palmitic and stearic acids | 1.000 |
| Commercial soy lecithin | 0.500 |
| A mixture of mono-di- and tri-isopropyl citrates | 0.075 |

The sodium bicarbonate or citric acid was coated with the fat in the creaming operation heretofore described, at which time the water dispersible emulsifying agent (polyoxyethylene sorbitan trioleate) was also added to the fat. The uncoated component of the carbonation system was incorporated in the mix with the dry supplementary ingredients, as heretofore described.

there is no assurance that the packaged material may not be stored during extended shelf life under conditions (high humidity) permitting moisture uptake. To prevent such moisture promoting soap formation, acids with a dissociation constant greater than $1 \times 10^{-8}$ are included in the fat. Thus the phosphatides, particularly lecithin, and the mixture of mono- and di-alkyl or -alkylene citrates in the fat being much stronger acids than the free fatty acids preferentially bind the sodium ions derived from the sodium bicarbonate in the presence of water.

Because of the presence of these relatively strong acids in the fat component, it is preferable not to add the water dispersible emulsifying agents to the fat prior to plasticising. During the period the fat is stored, up to the time that the sodium bicarbonate is incorporated, opportunities exist for the esterification of the water dispersible emulsifying agents. The resulting esters, like those derived from the reactions between citric acid and the water dispersible emulsifying agents, are ineffective in dispersing the fat in the aqueous phase of the final frostings. Because of the large molecular weights of the water dispersible emulsifying agents, relatively small amounts of the reactive acids are potentially detrimental. For example, the mean molecular weight of the mixture of mono-, di- and tri-isopropyl citrates (in the ratio of about 65:30:5) used in the experiments cited is 251, while that of the polyoxyethylene sorbitan trioleate is 1836.

TABLE IV

Comparative tests demonstrating the efficacy of the technique employed in stabilizing the emulsifying system in preferred frosting mixes of this invention

| Frosting Mix No. | Description [1] | Objective Measurements on Frostings [2] | | | Appearance of Frosting | Overall Rating of Frosting |
|---|---|---|---|---|---|---|
| | | Specific Volume [2] | Viscosity, MacMichael Units [2] | Flowability, Seconds [2] | | |
| 16 | Freshly prepared with the sodium bicarbonate ingredient coated with the fat component and the citric acid subsequently added with the supplementary drying ingredients. | 1.31 | 27 | 900+ | Fluffy, glossy, excellent body, fat dispersed. | Excellent. |
| | Same after 4 months storage at room temperature (70–75° F.). | 1.36 | 26 | 900+ | ...do... | Do. |
| 21 | Freshly prepared with the citric acid ingredient coated with the fat component and the sodium bicarbonate subsequently added with the supplementary dry ingredients. | 1.36 | 27 | 900+ | ...do... | Do. |
| | Same after only 1 month storage at room temperature (70–75° F.). | 1.18 | 18 | 111 | Fluffy, coarse, curdly, fat not dispersed, marked syneresis. | Poor. |

[1] The ingredients in the two frosting mixes are qualitatively and quantitatively identical; the sole difference between them was the manner of formulation.
[2] The same footnotes to Table I apply to these column headings.

Table IV shows that the two frosting mixes when freshly prepared yield excellent frostings with no significant differences observed by subjective examinations and objective measurements. However, after storage, the frosting mix containing the citric acid in the fat component is definitely poor according to all criteria due to failure of the fat to disperse adequately in the aqueous phase of the frosting, while even after four months' storage under identical conditions the mix having the fat-coated sodium bicarbonate remained unchanged.

As long as the fat component containing the sodium bicarbonate is not contaminated with water, there can be no soap formation. It is a relatively simple matter to make frosting mixes of this invention practically free of moisture (less than 1.0 per cent) using ingredients which are readily commercially available. However, Thus, one part of these mixed esters of citric acid (predominantly partial esters) are capable of esterifying a theoretical maximum of 13 parts of the polyoxyethylene sorbitan trioleate; in short, despite the fact that the concentration of the water dispersible emulsifying agent in the fat is 10 times that of the isopropyl citrate esters in the experiment cited, the isopropyl citrate esters are still capable of rendering ineffective 30 per cent more of the water dispersible emulsifying agent. In the presence of sodium bicarbonate, the water dispersible emulsifying agents do not participate in the undesirable esterification reactions; therefore, it is preferred to add together the sodium bicarbonate and the water dispersible emulsifying agents to the fat just prior to the formulation of the preferred frosting mixes of this invention.

A related procedure may be used with equal success in preparing frosting mixes, exhibiting no soap formation or loss of emulsifying system or deterioration of the carbonation system during extended storage. This procedure involves adding the water dispersible emulsifying agent to the fat prior to plasticizing and adding the lecithin and mixture of isopropyl citrates along with the sodium bicarbonate just before the creaming of the fat on sugar in making the final frosting mix. However, this is not the most desirable procedure since the lecithin and monoisopropyl citrate act also as metal scavengers in protecting the fat against the development of rancidity and should preferably be added as soon as possible to the refined deodorized fat. Furthermore, the water dispersible emulsifying agents have been discovered to be pro-oxidants but only in the absence of these metal scavengers; therefore, it is preferred to add the water dispersible emulsifying agent last to the fat along with the sodium bicarbonate just prior to the formulation of the frosting mix.

A more comprehensive understanding of this invention is obtained by reference to the following examples:

EXAMPLE 1

In this example, the plant production of a preferred frosting mix of this invention is described. The composition of this preferred frosting mix is as follows:

| Ingredient | Amount Required for 850 lb. Batch |
| --- | --- |
| | lbs. |
| Powdered sugar | 721 |
| Plasticized, hydrogenated vegetable oil (with additives) | 85 |
| Skim milk powder | 20 |
| Cold-water-soluble starch | 8.5 |
| Sodium bicarbonate | 4.69 |
| Common salt | 4.25 |
| Citric acid | 4.00 |
| Natural vanilla product (fortified) | 2.125 |
| Polyoxyethylene sorbitan trioleate | 0.625 |
| Vanillin | 0.084 |
| Coumarin | 0.002 |

Powdered or confectioners sugar, 96% of which passes through a standard U. S. 200-mesh screen, is used. About 3% of starch is present in the powdered sugar so that it will remain as a free flowing powder despite storage under adverse conditions. Commercial powdered sugar customarily contains this quantity of starch. The hydrogenated vegetable oil is a 60:40 blend of cottonseed and peanut oils hydrogenated to have a melting point of 105° F. and a setting point of 85° F. The hydrogenated vegetable oil has incorporated in it 0.075% of a mixture of mono-, di- and tri-isopropyl citrates, 0.5% of commercial soy lecithin and 1.0% of a mixture of equal parts of mono- and di-glycerides of palmytic and stearic acids. These additives are incorporated in the hydrogenated vegetable oil prior to plasticizing with nitrogen to a gas content of 12%. The milk powder is a low-heat-processed preparation, the solubility of the proteins of which are not impaired. The starch ingredient is a bland, edible material readily soluble in cold water. The most finely divided common salt available, so-called flour salt, is used; substantially all of this salt is capable of passing through a U. S. standard 60 mesh screen. The sodium bicarbonate and the citric acid are anhydrous, free flowing powders. The natural vanilla product (fortified) is a mixture of cane sugar and pure vanilla oil, extracted from the beans and containing all the natural active principles including color, resins, and other aromatics; it is fortified by the supplier with vanillin so that weight for weight, the product is equivalent in flavor strength to that of the whole bean. The water dispersible emulsifying agent, polyoxyethylene sorbitan trioleate, contains 20 oxyethylene units in the one polyoxyethylene chain.

The frosting mix of this example is prepared by producing pre-mixes of some of the ingredients and finally mixing these pre-mixes with additional ingredients, as will be presently described. The preparation of pre-mixes is desirable since in continuing manufacturing operations, it reduces the frequency with which ingredients present in relatively small concentrations need be weighed.

1. Preparation of Premix No. 1 (sufficient for 10.5 batches):

(a) To a mixer are added:

Powdered sugar _____ 100 lb.
Sodium bicarbonate _____ 49 lb. 5 oz.
Hydrogenated vegetable oil _____ 84 lb.
Polyoxyethylene sorbitan trioleate __ 6 lb. 9 oz.

and the mixture creamed to a specific volume of about 1.25, range of 1.15 to 1.30.

(b) 600 lbs. 14 oz. of powdered sugar are added and the mixture turned over until a free flowing mass is obtained. The Premix No. 1 is stored in sealed containers in a cool dry location.

2. Preparation of Premix No. 2 (sufficient for 40 batches):

(a) To a mixer are added:

Cold-water-soluble starch _____ 340 lb.
Citric acid _____ 160 lb.
Common salt _____ 170 lb.
Natural vanilla product _____ 85 lb.
Vanillin _____ 3 lb. 6 oz.
Coumarin _____ 1.25 oz.

and the mixture agitated until a uniform product is obtained. This Premix No. 2 is also stored in sealed containers in a cool dry location.

The mixer used in the preparation of Premix No. 1 and Premix No. 2 and the final frosting mix is of 1000 lb. capacity and contains a double-ribbon (opposite-wise working outer and inner ribbons) agitator strung with piano wires and revolving at 67 revolutions per minute.

3. Preparation of the frosting mix:

(a) To the mixer are added:

Powdered sugar _____ 80 lb.
Premix No. 1 _____ 80 lb. (9.53 per cent of total Premix No. 1)
Hydrogenated vegetable oil __ 77 lb.

and the mixture creamed to a specific volume of about 1.25, range of 1.15 to 1.30.

(b) The other ingredients are added to complete the mix, namely:

Powdered sugar _____ 575 lb.
Skim milk powder _____ 20 lb.
Premix No. 2 _____ 19 lb. (2.5 per cent of total Premix No. 2)

and the overall mixture is turned over until a free flowing mass is obtained.

EXAMPLE 2

The frosting mix described in this example is one prepared on a laboratory scale. Since laboratory frosting mixes are not prepared on a continuing basis, there is no need for the preparation of premixes in the production of the frosting mixes of this example or those of the subsequently described examples.

The composition of the frosting mix of this example is as follows:

| Ingredient | Amount Required for 2550 gm. Batch |
|---|---|
| | gm. |
| Powdered sugar | 2,120.25 |
| Plasticized hydrogenated vegetable oil (with additives) | 255.00 |
| Skim milk powder | 127.50 |
| Sodium bicarbonate | 14.06 |
| Common salt | 12.75 |
| Citric acid | 12.00 |
| Natural vanilla product (fortified) | 6.38 |
| Polyoxyethylene sorbitol hexastearate | 1.88 |
| Vanillin | 0.26 |

The water dispersible emulsifying agent, polyoxyethylene sorbitol hexastearate, contains 40 oxyethylene units in the 6 polyoxyethylene chains. The other designated ingredients in the frosting mix of this example are qualitatively the same as those common to Example 1. The same additives as in Example 1 were incorporated at the same levels in the hydrogenated vegetable oil (prior to plasticizing) used in this example.

The laboratory method for preparing the mix is as follows:

1. To 430 gm. of sugar in a laboratory Hobart mixer is added a freshly prepared mixture of 24.0 gm. of the melted hydrogenated vegetable oil at 140° F. containing 1.88 gm. of the sorbitol hexastearate derivative in solution and 14.06 gm. of the sodium bicarbonate in suspension. A portion of the sugar is used to effect a quantitative transfer of the sodium bicarbonate suspension in oil to the mixer. The contents of the mixer are turned over at No. 1 (low) speed for a period of 15 seconds. (Mixing to obtain a uniform product is not required at this stage.)

2. 231 gm. of the plasticized hydrogenated vegetable oil are then added and the mixer allowed to run for 1 minute at No. 1 speed, and then for 10 to 20 minutes at No. 2 (intermediate) speed. The specific volume of the creamed mass approximates 1.25, ranging from 1.15 to 1.3.

3. The remaining ingredients are added to complete the frosting mix, namely:

| | Grams |
|---|---|
| Powdered sugar | 1690.25 |
| Skim milk powder | 127.50 |
| Citric acid | 12.00 |
| Salt | 12.75 |
| Natural vanilla product | 6.38 |
| Vanillin | 0.26 |

The overall mixture is turned over at No. 1 speed for 2 to 5 minutes until a free flowing mass is obtained.

EXAMPLE 3

The composition of the frosting mix of this example is as follows:

| Ingredient | Amount Required for 2850 gm. Batch |
|---|---|
| | gm. |
| Powdered sugar | 2,240.75 |
| Breakfast cocoa | 300.00 |
| Plasticized hydrogenated vegetable oil (with additives) | 255.00 |
| Sodium bicarbonate | 20.00 |
| Common salt | 13.00 |
| Citric acid | 12.00 |
| Natural vanilla product (fortified) | 7.00 |
| Polyoxyethylene monostearate | 2.00 |
| Vanillin | 0.25 |

The water dispersible emulsifying agent, polyoxyethylene monostearate, contains 40 oxyethylene units in the one polyoxyethylene chain. The breakfast cocoa is the customary article of commerce. The other designated ingredients in the frosting mix of this example are qualitatively the same as those common to Example 1. The hydrogenated vegetable oil is the same as that described in Example 1 except that it contains 0.06% of a mixture of mono-, di- and tri-stearyl citrates instead of the mixture of isopropyl citrates; the other additives are qualitatively and quantitatively the same.

The laboratory method for preparing the mix is as follows:

1. To 430 gm. of sugar in a laboratory Hobart mixer is added a freshly prepared mixture of 24.0 gm. of the melted hydrogenated vegetable oil at 140° F. containing 2.00 gm. of the polyoxyethylene monostearate in solution and 20.00 gm. of the sodium bicarbonate in suspension. A portion of the sugar is used to effect a quantitative transfer of the sodium bicarbonate suspension in oil to the mixer. The contents of the mixer are turned over at No. 1 (low) speed for a period of 15 seconds. (Mixing to obtain a uniform product is not required at this stage.)

2. 231 gm. of the plasticized hydrogenated vegetable oil are then added and the mixer allowed to run for 1 minute a No. 1 speed, and then for 10 to 20 minutes at No. 2 (intermediate) speed. The specific volume of the creamed mass approximates 1.25, ranging from 1.15 to 1.3.

3. The remaining ingredients are added to complete the frosting mix, namely:

| | Grams |
|---|---|
| Powdered sugar | 1810.75 |
| Breakfast cocoa | 300.00 |
| Citric acid | 12.00 |
| Salt | 13.00 |
| Natural vanilla product | 7.00 |
| Vanillin | 0.25 |

The overall mixture is turned over at No. 1 speed for 2 to 5 minutes until a free flowing mass is obtained.

EXAMPLE 4

The composition of the frosting mix of this example is as follows:

| Ingredient | Amount Required for 2550 gm. Batch |
|---|---|
| | gm. |
| Powdered sugar | 2,033.17 |
| Plasticized hydrogenated vegetable oil | 382.00 |
| Skim milk powder | 60.00 |
| Cold-water-soluble starch | 25.50 |
| Sodium bicarbonate | 14.00 |
| Tartaric Acid | 14.00 |
| Common Salt | 11.00 |
| Natural vanilla product (fortified) | 7.00 |
| Polyoxyethylene stearate-oleate | 3.08 |
| Vanillin | 0.25 |

The water dispersible emulsifying agent is a complete fatty acid ester of polyoxyethylene glycol and contains 25 oxyethylene units in the one polyoxyethylene chain connecting the two fatty acid groups. The tartaric acid is anhydrous and free-flowing. The other designated ingredients in the formula of this example are qualitatively the same as those in Example 1 except that the fat component in the frosting mix of this example contains no soy lecithin, no mono- or di-glycerides of fatty acids, and no mono- or di-aliphatic citrate esters. For this reason, the water dispersible emulsifying agent is added to the fat prior to plasticizing.

The laboratory method for preparing the mix is as follows:

1. To 650 gm. of sugar in a laboratory Hobart mixer is added the 14 gm. of sodium bicarbonate and the mixture turned over for a period of 15 seconds. To the mixture are added 385.08 gm. of the plasticized hydrogenated vegetable oil containing 0.8 per cent of the polyoxyethylene stearate-oleate, and the mixer allowed to run for 1 minute at No. 1 speed, and then for 10 to 20 minutes at No. 2 (intermediate) speed. The specific volume of the creamed mass approximates 1.25, ranging between 1.15 to 1.3.

2. The remaining ingredients are added to complete the frosting mix, namely:

| | Grams |
|---|---|
| Powdered sugar | 1383.17 |
| Skim milk powder | 60.00 |
| Cold-water-soluble starch | 25.50 |
| Tartaric acid | 14.00 |
| Salt | 11.00 |
| Natural vanilla product | 7.00 |
| Vanillin | 0.25 |

The overall mixture is turned over at No. 1 speed for 2 to 5 minutes until a free flowing mass is obtained.

EXAMPLE 5

The composition of the frosting mix of this example is as follows:

| Ingredient | Amount Required for 2550 gm. Batch |
|---|---|
| | gm. |
| Powdered sugar | 2,162.16 |
| Plasticized lard (with additives) | 255.00 |
| Skim milk powder | 60.00 |
| Cold-water-soluble starch | 25.50 |
| Sodium bicarbonate | 14.06 |
| Common salt | 12.75 |
| Citric acid | 12.00 |
| Natural vanilla product (fortified) | 6.38 |
| Polyoxyethylene glycerol monopalmitate | 1.88 |
| Vanillin | 0.26 |
| Coumarin | 0.01 |

The lard preparation is deodorized prior to plasticizing and has a melting point of 102° F. and a setting point of 83° F. The lard has incorporated in it 0.075% of a mixture of mono-, di- and tri-isopropyl citrates, 0.02% of a mixture of 3-tertiarybutyl 4-hydroxyanisole and 2-tertiarybutyl 4-hydroxyanisole, 0.006% of propyl gallate, 0.5% commercial soy lecithin, and 1.0% of a mixture of equal parts of mono- and di-glycerides of palmitic and stearic acids. These additives are incorporated in the lard prior to plasticizing with nitrogen to a gas content of 12%. The water dispersible emulsifying agent, polyoxyethylene glycerol mono-palmitate, contains 10 oxyethylene units per mol. The other ingredients in the frosting mix of this example are qualitatively the same as those in Example 1.

The laboratory method for preparing the mix is as follows:

1. To 430 gm. of sugar in a laboratory Hobart mixer is added a freshly prepared mixture of 24.0 gm. of the melted lard at 140° F. containing 1.88 gm. of the glycerol monopalmitate derivative in solution and 14.06 gm. of the sodium bicarbonate in suspension. A portion of the sugar is used to effect a quantitative transfer of the sodium bicarbonate suspension in oil to the mixer. The contents of the mixer are turned over at No. 1 (low) speed for a period of 15 seconds. (Mixing to obtain a uniform product is not required at this stage.)

2. 231 gm. of the plasticized lard are then added and the mixer allowed to run for 1 minute at No. 1 speed and then for 10 to 20 minutes at No. 2 (intermediate) speed. The specific volume of the creamed mass approximates 1.25, ranging from 1.15 to 1.3.

3. The remaining ingredients are added to complete the frosting mix, namely:

| | Grams |
|---|---|
| Powdered sugar | 1732.16 |
| Skim milk powder | 60.00 |
| Cold-water-soluble starch | 25.50 |
| Salt | 12.75 |
| Citric acid | 12.00 |
| Natural vanilla product | 6.38 |
| Vanillin | 0.26 |
| Coumarin | 0.01 |

The overall mixture is turned over at No. 1 speed for 2 to 5 minutes until a free flowing mass is obtained.

The terms and expressions which I have employed are used as terms of description and not of limitation, and I have no intention, in the use of such terms and expressions, of excluding any equivalents of the features described or portions thereof, but recognize that various modifications are possible within the scope of the invention claimed.

What is claimed is:

1. A dry frosting mix comprising at least 70% powdered sugar, ¼ to 1½% of sodium bicarbonate, ¼ to ¾% of an edible, solid aliphatic polycarboxylic acid having a dissociation constant for the first hydrogen of at least $1 \times 10^{-5}$ and at least 5% of an edible fat having incorporated therein at least 0.2% of a water dispersible emulsifying agent selected from the class consisting of partial fatty acid esters of polyhydric alcohols containing at least one polyoxyethylene chain, complete fatty acid esters of the condensation products of polyhydric alcohols and ethylene oxide in which all of the hydroxyl groups of the alcohols contain polyoxyethylene chains, partial fatty acid esters of polyoxyethylene glycol and complete fatty acid esters of polyoxyethylene glycol, the oxyethylene units per mol of each of said members being at least five and each fatty acid group in said members containing at least twelve carbon atoms.

2. A dry frosting mix comprising at least 70% of powdered sugar, at least 5% of an edible fat having incorporated therein at least 0.2% of a water dispersible emulsifying agent, ¼ to 1½% of sodium bicarbonate and ¼ to ¾% of an edible, solid aliphatic polycarboxylic acid having a dissociation constant for the first hydrogen of at least $1 \times 10^{-5}$; the ratio of sodium bicarbonate to said acid being from 0.8 to 3.3 parts of sodium bicarbonate to 1 part of said acid; said frosting mix containing not more than 0.3% of said emulsifying agent and said emulsifying agent being selected from the class consisting of partial fatty acid esters of the anhydrides of six-carbon sugar alcohols containing at least one polyoxyethylene chain, complete fatty acid esters of the condensation products of six-carbon sugar alcohols and ethylene oxide in which all of the hydroxyl groups of the sugar alcohols contain polyoxyethylene chains, partial fatty acid esters of polyoxyethylene glycol and complete fatty acid esters of polyoxyethylene glycol, the oxyethylene units per mol of each of said members being at least five and each fatty acid group in said members containing at least twelve carbon atoms.

3. A dry frosting mix comprising at least 70% of powdered sugar, at least 5% of an edible fat having a melting point of 90° to 115° F. and a congealing point of 75° to 95° F. and having incorporated therein 0.2 to 2.0% of a water dispersible emulsifying agent, ¼ to 1½% of sodium bicarbonate and ¼ to ¾% of an edible, solid aliphatic polycarboxylic acid having a dissociation constant for the first hydrogen of at least 1 x $10^{-5}$; the ratio of sodium bicarbonate to said acid being from 0.8 to 3.3 parts of sodium bicarbonate to 1 part of said acid; said frosting mix containing not more than 0.2% of said emulsifying agent and said emulsifying agent being a partial fatty acid ester of the anhydrides of six-carbon sugar alcohols containing at least one polyoxyethylene chain, the oxyethylene units per mol of said partial fatty acid ester being 5 to 20 and each fatty acid group in said partial fatty acid ester containing 12 to 20 carbon atoms.

4. A dry frosting mix comprising at least 70% of powdered sugar, at least 5% of an edible fat having a melting point of 90° to 115° F. and a congealing point of 75° to 95° F. and having incorporated therein 0.2 to 2.0% of a water dispersible emulsifying agent, ¼ to 1½% of sodium bicarbonate and ¼ to ¾% of an edible, solid aliphatic polycarboxylic acid having a dissociation constant for the first hydrogen of at least 1 x $10^{-5}$; ratio of sodium bicarbonate to said acid being from 0.8 to 3.3 parts of sodium bicarbonate to 1 part of said acid; said frosting mix containing not more than 0.2% of said emulsifying agent and said emulsifying agent being a complete fatty acid ester of the condensation products of six-carbon sugar alcohols and ethylene oxide, in which all of the hydroxyl groups of the sugar alcohols contain polyoxyethylene chains, the oxyethylene units per mol of said complete fatty acid ester being 20 to 80 and each fatty acid group in said complete fatty acid ester containing from 12 to 20 carbon atoms.

5. A dry frosting mix comprising at least 70% of powdered sugar, at least 5% of an edible fat having a melting point of 90° to 115° F. and a congealing point of 75° to 95° F. and having incorporated therein 0.2 to 2.0% of a water dispersible emulsifying agent, ¼ to 1½% of sodium bicarbonate and ¼ to ¾% of an edible, solid aliphatic polycarboxylic acid having a dissociation constant for the first hydrogen of at least 1 x $10^{-5}$; the ratio of sodium bicarbonate to said acid being from 0.8 to 3.3 parts of sodium bicarbonate to 1 part of said acid; said frosting mix containing not more than 0.2% of said emulsifying agent and said emulsifying agent being a partial fatty acid ester of polyoxyethylene glycol, the oxyethylene units per mol of said partial fatty acid ester being 20 to 50 and each fatty acid group in said partial fatty acid ester containing 12 to 20 carbon atoms.

6. A dry frosting mix comprising at least 70% of powdered sugar, at least 5% of an edible fat having a melting point of 90° to 115° F. and a congealing point of 75° to 95° F. and having incorporated therein 0.2 to 2.0% of a water dispersible emulsifying agent, ¼ to 1½% of sodium bicarbonate and ¼ to ¾% of an edible, solid aliphatic polycarboxylic acid having a dissociation constant for the first hydrogen of at least 1 x $10^{-5}$; the ratio of sodium bicarbonate to said acid being from 0.8 to 3.3 parts of sodium bicarbonate to 1 part of said acid; said frosting mix containing not more than 0.2% of said emulsifying agent and said emulsifying agent being a complete fatty acid ester of polyoxyethylene glycol, the oxyethylene units per mol of said complete fatty acid ester being 20 to 80 and each fatty acid group in said complete fatty acid ester containing 12 to 20 carbon atoms.

7. A dry frosting mix comprising at least 70% of powdered sugar, at least 5% of an edible fat having a melting point of 90° to 115° F. and a congealing point of 75° to 95° F., ¼ to 1½% of sodium bicarbonate, ¼ to ¾% of an edible, solid aliphatic polycarboxylic acid having a dissociation constant for the first hydrogen of at least 1 x $10^{-5}$, 0 to 10% of milk powder, 0 to 5% of edible bland cold-water-soluble starch, and flavoring agents; said edible fat having incorporated therein 0.2 to 2.0% of a water dispersible emulsifying agent, 0.02 to 0.1% of mono-, di- and tri-aliphatic citrates, 0.15 to 0.45% of lecithin and 0.5 to 2.0% of a mixture of mono- and di-glycerides of fatty acids having 16 and 18 carbon atoms; the ratio of sodium bicarbonate to said acid being from 0.8 to 3.3 parts of sodium bicarbonate to 1 part of said acid; said frosting mix containing not more than 0.2% of said emulsifying agent and said emulsifying agent being selected from the class consisting of partial fatty acid esters of the anhydrides of six-carbon sugar alcohols containing at least one polyoxyethylene chain, complete fatty acid esters of the condensation products of six-carbon sugar alcohols and ethylene oxide in which all of the hydroxyl groups of the sugar alcohols contain polyoxyethylene chains, partial fatty acid esters of polyoxyethylene glycol and complete fatty acid esters of polyoxyethylene glycol, the oxyethylene units per mol of each of said members being at least five and each fatty acid group in said members containing at least twelve carbon atoms.

8. A dry frosting mix comprising 75 to 90% of powdered sugar, 5 to 15% of an edible fat having a melting point of 100 to 110° F. and a congealing point of 80 to 90° F., ⅖ to ¾% of sodium bicarbonate, ⅓ to ⅔% of citric acid, 2 to 5% of skim milk powder, 1 to 2% of an edible bland cold-water-soluble starch, and flavoring agents; said edible fat having incorporated therein 0.5 to 1.0% of a water dispersible emulsifying agent, 0.04 to 0.08% of mono-, di- and tri-aliphatic citrates, 0.25 to 0.35% of lecithin and 0.75 to 1.25% of a mixture of mono- and di-glycerides of fatty acids having 16 and 18 carbon atoms; the ratio of sodium bicarbonate to citric acid being 1.0 to 1.5 parts of sodium bicarbonate to 1 part of citric acid; said frosting mix containing from 0.05 to 0.10% of said emulsifying agent and said emulsifying agent being a tri-fatty acid ester of polyoxyethylene sorbitan, the one polyoxyethylene chain on the sorbitan nucleus containing 15 to 20 oxyethylene units and having a free terminal hydroxyl group, and each fatty acid group containing at least 16 and not more than 18 carbon atoms.

9. A dry frosting mix comprising 75 to 90% of powdered sugar, 5 to 15% of an edible fat having a melting point of 100° to 110° F. and a congealing point of 80° to 90° F., ⅖ to ¾% of sodium bicarbonate, ⅓ to ⅔% of citric acid, 2 to 5% of skim milk powder, 1 to 2% of an edible bland cold-water-soluble starch, and flavoring agents; said edible fat having incorporated therein 0.5 to 1.0% of a water dispersible emulsifying agent, 0.04 to 0.08% of mono-, di- and tri-aliphatic citrates, 0.25 to 0.35% of lecithin and 0.75 to 1.25% of a mixture of mono- and di-glycerides of fatty acids having 16 and 18 carbon atoms; the ratio of sodium bicarbonate to citric acid being 1.0 to 1.5 parts of sodium bicarbonate to 1 part of citric acid; said frosting mix containing 0.05 to 0.10% of said emulsifying agent and said emulsifying agent being a complete fatty acid ester of the condensation product of sorbitol and ethylene oxide, in which all of the hydroxyl groups of the sorbitol contain polyoxyethylene chains, the oxyethylene units per mol of said complete fatty acid ester being 30 to 60 and each fatty acid group in said complete fatty acid ester containing not less than 16 and not more than 18 carbon atoms.

10. A dry frosting mix comprising 75 to 90% of powdered sugar, 5 to 15% of an edible fat having a melting point of 100° to 110° F. and a congealing point of 80 to 90° F., ⅖ to ¾% of sodium bicarbonate, ⅓ to ⅔% of citric acid, 2 to 5% of skim milk powder, 1 to 2% of an edible bland cold-water-soluble starch, and flavoring agents; said edible fat having incorporated therein 0.5 to 1.0% of a water dispersible emulsifying agent, 0.04 to 0.08% of mono-, di- and tri-aliphatic citrates, 0.25 to 0.35% of lecithin and 0.75 to 1.25% of a mixture of mono- and di-glycerides of fatty acids having 16 and 18 carbon atoms; the ratio of sodium bicarbonate to citric acid being from 1.0 to 1.5 parts of sodium bicarbonate to 1 part of citric acid; said frosting mix containing 0.05 to 0.10% of said emulsifying agent and said emulsifying agent being a partial fatty acid ester of polyoxyethylene glycol, the oxyethylene units per mol of said partial fatty acid ester being 25 to 45 and the fatty acid group in said partial fatty acid ester containing not less than 16 and not more than 18 carbon atoms.

11. A dry frosting mix comprising 75 to 90% of powdered sugar, 5 to 15% of an edible fat having a melting point of 100° to 110° F. and a congealing point of 80 to 90° F., ⅖ to ¾% of sodium bicarbonate, ⅓ to ⅔% of citric acid, 2 to 5% of skim milk powder, 1 to 2% of an edible bland cold-water-soluble starch, and flavoring agents; said edible fat having incorporated therein 0.5 to 1.0% of a water dispersible emulsifying agent, 0.04 to 0.08% of mono-, di- and tri-aliphatic citrates, 0.25 to 0.35% of lecithin and 0.75 to 1.25% of a mixture of mono- and di-glycerides of fatty acids having 16 and 18 carbon atoms; the ratio of sodium bicarbonate to citric acid being from 1.0 to 1.5 parts of sodium bicarbonate to 1 part of citric acid; said frosting mix containing 0.05 to 0.10% of said emulsifying agent and said emulsifying agent being a complete fatty ester of polyoxyethylene glycol, the oxyethylene units per mol of said complete fatty acid ester being 25 to 60 and each fatty acid group in said complete fatty acid ester containing not less than 16 and not more than 18 carbon atoms.

12. A method of producing a dry frosting mix comprising at least 70% powdered sugar, ¼ to 1½% of substantially moisture-free sodium bicarbonate, ¼ to ¾% of an edible, solid substantially moisture-free aliphatic polycarboxylic acid having a dissociation constant for the first hydrogen of at least $1 \times 10^{-5}$ and at least 5% of an edible fat having incorporated therein at least 0.2% of an anhydrous water dispersible emulsifying agent, said method comprising homogeneously suspending the sodium bicarbonate in the fat containing the water dispersible emulsifying agent, creaming the resulting mixture with a portion of the powdered sugar until the sodium bicarbonate is substantially coated with said fat, adding the remaining ingredients of the frosting mix comprising the remainder of the powdered sugar and the edible solid aliphatic polycarboxylic acid and mixing until a uniform free-flowing mass is obtained; said water dispersible emulsifying agent being selected from the class consisting of partial fatty acid esters of polyhydric alcohols containing at least one polyoxyethylene chain, complete fatty acid esters of the condensation products of polyhydric alcohols and ethylene oxide in which all of the hydroxyl groups of the alcohols contain polyoxyethylene chains, partial fatty acid esters of polyoxyethylene glycol and complete fatty acid esters of polyoxyethylene glycol, the oxyethylene units per mol of each of said members being at least five and each fatty acid group in said members containing at least twelve carbon atoms.

13. A method of producing a dry frosting mix comprising at least 70% powdered sugar, ¼ to 1½% of substantially moisture-free sodium bicarbonate, ¼ to ¾% of an edible, solid substantially moisture-free aliphatic polycarboxylic acid having a dissociation constant for the first hydrogen of at least $1 \times 10^{-5}$, and at least 5% of an edible fat having incorporated therein at least 0.2% of an anhydrous water dispersible emulsifying agent and 0.02 to 0.45% of an edible anhydrous acid having a dissociation constant greater than $1 \times 10^{-3}$, said method comprising homogeneously dispersing the fat, the edible anhydrous acid having a dissociation constant greater than $1 \times 10^{-3}$, adding to the resulting fat the sodium bicarbonate and the water dispersible emulsifying agent just prior to formulation of the frosting mix, creaming the resulting mixture with ½ to 3 times its weight of powdered sugar until the sodium bicarbonate is substantially completely coated with said fat, adding the remaining ingredients of the frosting mix comprising the remainder of said powdered sugar and the solid aliphatic polycarboxylic acid having a dissociation constant for the first hydrogen of at least $1 \times 10^{-5}$, and mixing until a uniform free flowing mass is obtained; said water dispersible emulsifying agent being selected from the class consisting of partial fatty acid esters of the anhydrides of six carbon sugar alcohols containing at least one polyoxyethylene chain, complete fatty acid esters of the condensation products of six-carbon sugar alcohols and ethylene oxide in which all of the hydroxyl groups of the sugar alcohols contain polyoxyethylene chains, partial fatty acid esters of polyoxyethylene glycol and complete fatty acid esters of polyoxyethylene glycol, the oxyethylene units per mol of each of said members being at least five and each fatty acid group in said members containing at least twelve carbon atoms.

14. A method of producing a dry frosting mix comprising 75 to 90% of powdered sugar, ⅖ to ¾% of substantially moisture-free sodium bicarbonate, ⅓ to ⅔% of anhydrous citric acid, 2 to 5% of skim milk powder, flavoring agents, 5 to 15% of an edible fat having a melting point of 100° to 110° F. and a congealing point of 80° to 90° F., said fat containing 0.5 to 1.0% of an anhydrous water dispersible emulsifying agent, 0.04 to 0.08% of a mixture of anhydrous mono-, di- and tri-aliphatic citrates, and 0.25 to 0.35% of anhydrous lecithin, said method comprising incorporating in said fat, said mixture of mono-, di- and tri-aliphatic citrates and lecithin, adding to the resulting fat the sodium bicarbonate and the water dispersible emulsifying agent just prior to formulation of the frosting mix, creaming the resulting mixture with 1½ to 2 times its weight of powdered sugar until a specific volume of 1.15 to 1.3 is obtained and said sodium bicarbonate is substantially completely coated with said fat, adding the remaining ingredients of the frosting mix comprising the remainder of said powdered sugar, the skim milk powder, the citric acid and flavoring agents and mixing until a uniform free flowing mass is obtained; said water dispersible emulsifying agent being a tri-fatty acid ester of polyoxyethylene sorbitan, the one polyoxyethylene chain on the sorbitan nucleus containing 15 to 20 oxyethylene units and having a free terminal hydroxyl group, and each fatty acid group containing at least 16 and not more than 18 carbon atoms.

15. A method of producing a dry frosting mix comprising 75 to 90% of powdered sugar, ⅔ to ¾% of substantially moisture-free sodium bicarbonate, ⅓ to ⅔% of anhydrous citric acid, 2 to 5% of skim milk powder, flavoring agents, 5 to 15% of an edible fat having a melting point of 100° to 110° F. and a congealing point of 80° to 90° F.; said fat containing 0.5 to 1.0% of an anhydrous water dispersible emulsifying agent, 0.04 to 0.08% of a mixture of anhydrous mono-, di- and tri-aliphatic citrates, and 0.25 to 0.35% of anhydrous lecithin, said method comprising incorporating in said fat, said mixture of mono-, di- and tri-aliphatic citrates and lecithin, adding to the resulting fat the sodium bicarbonate and the water dispersible emulsifying agent just prior to formulation of the frosting mix, creaming the resulting mixture with 1½ to 2 times its weight of powdered sugar until a specific volume of 1.15 to 1.3 is obtained and said sodium bicarbonate is substantially completely coated with said fat, adding the remaining ingredients of the frosting mix comprising the remainder of said powdered sugar, the skim milk powder, the citric acid and flavoring agents and mixing until a uniform free flowing mass is obtained; said water dispersible emulsifying agent being a complete fatty acid ester of the condensation product of sorbitol and ethylene oxide, in which all of the hydroxyl groups of the sorbitol contain polyoxyethylene chains, the oxyethylene units per mol of said complete fatty acid ester being 30 to 60 and each fatty acid group in said complete fatty acid ester containing at least 16 and not more than 18 carbon atoms.

16. The method of producing a dry frosting mix, comprising 75 to 90% of powdered sugar, ⅔ to ¾% of substantially moisture-free sodium bicarbonate, ⅓ to ⅔% of anhydrous citric acid, 2 to 5% of skim milk powder, flavoring agents, 5 to 15% of an edible fat having a melting point of 100° to 110° F. and a congealing point of 80° to 90° F., said fat containing 0.5 to 1.0% of an anhydrous water dispersible emulsifying agent, 0.04 to 0.08% of a mixture of anhydrous mono-, di- and tri-aliphatic citrates, and 0.25 to 0.35% of anhydrous lecithin, said method comprising incorporating in said fat, said mixture of mono-, di- and tri-aliphatic citrates and lecithin, adding to the resulting fat the sodium bicarbonate and the water dispersible emulsifying agent just prior to formulation of the frosting mix, creaming the resulting mixture with 1½ to 2 times its weight of powdered sugar until a specific volume of 1.15 to 1.3 is obtained and said sodium bicarbonate is substantially completely coated with said fat, adding the remaining ingredients of the frosting mix comprising the remainder of said powdered sugar, the skim milk powder, the citric acid and flavoring agents and mixing until a uniform free flowing mass is obtained; said water dispersible emulsifying agent being a partial fatty acid ester of polyoxyethylene glycol, the oxyethylene units per mol of said partial fatty acid ester being 25 to 45 and the fatty acid group in said partial fatty acid ester containing at least 16 and not more than 18 carbon atoms.

17. A method of producing a dry frosting mix comprising 75 to 90% of powdered sugar, ⅔ to ¾% of substantially moisture-free sodium bicarbonate, ⅓ to ⅔% of anhydrous citric acid, 2 to 5% of skim milk powder, flavoring agents, 5 to 15% of an edible fat having a melting point of 100° to 110° F. and a congealing point of 80° to 90° F., said fat containing 0.5 to 1.0% of an anhydrous water dispersible emulsifying agent, 0.04 to 0.08% of a mixture of anhydrous mono-, di- and tri-aliphatic citrates, and 0.25 to 0.35% of anhydrous lecithin, said method comprising incorporating in said fat, said mixture of mono-, di- and tri-aliphatic citrates and lecithin, adding to the resulting fat the sodium bicarbonate and the water dispersible emulsifying agent just prior to formulation of the frosting mix, creaming the resulting mixture with 1½ to 2 times its weight of powdered sugar until a specific volume of 1.15 to 1.3 is obtained and said sodium bicarbonate is substantially completely coated with said fat, adding the remaining ingredients of the frosting mix comprising the remainder of said powdered sugar, the skim milk powder, the citric acid and flavoring agents and mixing until a uniform free flowing mass is obtained; said water dispersible emulsifying agent being a complete fatty acid ester of polyoxyethylene glycol, the oxyethylene units per mol of said complete fatty acid ester being 25 to 60, and each fatty acid group in said complete fatty acid ester containing at least 16 and not more than 18 carbon atoms.

DANIEL MELNICK.

REFERENCES CITED

The following references are of record in the file of this patent:

UNITED STATES PATENTS

| Number | Name | Date |
| --- | --- | --- |
| 1,643,951 | Leo | Oct. 4, 1927 |
| 1,859,240 | Jordan | May 17, 1932 |
| 2,152,170 | Areiter | Mar. 28, 1939 |
| 2,278,466 | Musher | Apr. 7, 1942 |
| 2,474,019 | Steiner et al. | June 21, 1949 |
| 2,487,698 | Diamond | Nov. 8, 1949 |